358-86. OR 3,617,624 SR

[redacted]

United States Patent

[11] 3,617,624

[72] Inventors Rupert I. Kinross
Shepperton, Middlesex;
Lionel T. Mudd, Horley, Surrey, both of England

[21] Appl. No. 757,381
[22] Filed Sept. 4, 1968
[45] Patented Nov. 2, 1971
[73] Assignee Communications Patents Limited
London, England
[32] Priority Sept. 5, 1967
[33] Great Britain
[31] 40,467/67

[54] TELEVISION RECEIVING APPARATUS
3 Claims, 1 Drawing Fig.

[52] U.S. Cl. 178/5.8 A
[51] Int. Cl. H04n 5/62
[50] Field of Search 178/5.6, 5.8, 5.8 A

[56] References Cited
UNITED STATES PATENTS
3,135,922 6/1964 Eland 178/5.8 A

*Primary Examiner*—Richard Murray
*Attorney*—Laurence R. Brown

ABSTRACT: A subscriber system using an intercarrier broadcast television receiver provides for the processing of subscription signals at a different frequency range when not accompanied by a picture carrier by provision of two oscillators, one changing the subscription signals to a broadcast frequency and the other producing a carrier wave for reproduction of sound signals by the intercarrier method.

T5002
X5129

PATENTED NOV 2 1971 3,617,624
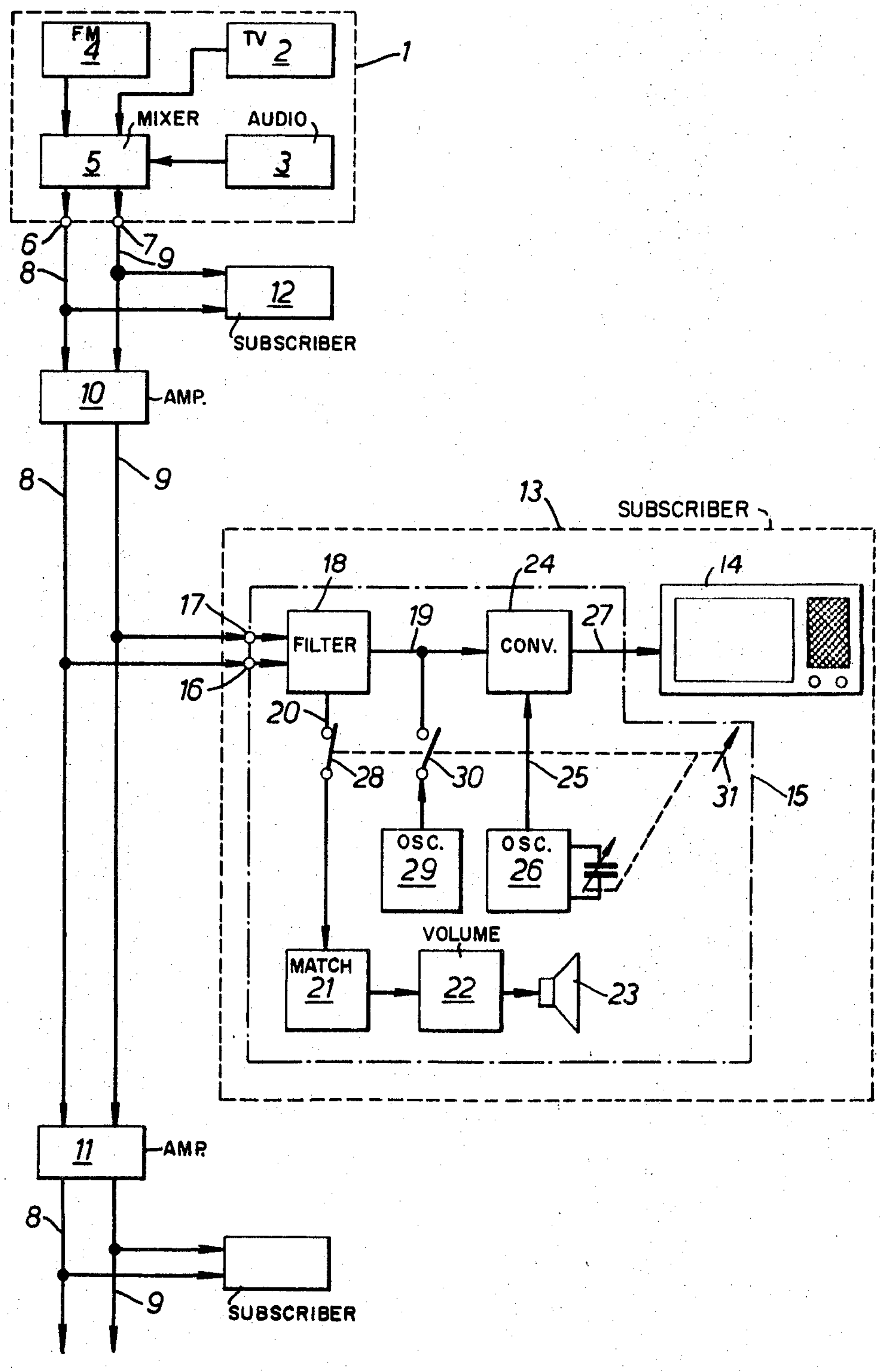
INVENTORS
Rupert I. Kinross
BY Lionel T. Mudd
Lawrence R. Brown
ATTORNEY

TELEVISION RECEIVING APPARATUS

This invention relates to wired broadcast systems and apparatus both of the very high frequency type in which signal adapters are employed for changing the frequencies of the distributed television program signals to the frequencies of a vacant channel in the VHF television broadcasting bands and of the high frequency type in which signal adapters are employed for changing the frequencies of the distributed television program signals to frequencies to which a television receiver designed for use with an aerial can be tuned.

In very high frequency broadcast systems it is usual to distribute picture signals pertaining to a television program at the same frequencies as they are broadcast by the radiated television broadcasting transmitter whose signals are being distributed over the wired broadcasting system. In such a very high frequency wired broadcasting system the frequencies of the distributed television program signals may be changed to the frequencies of a vacant channel in the VHF television broadcasting bands in order to minimize patterning or ghosting due to the simultaneous reception of off-air signals on the subscriber's receiver.

In high frequency wired broadcasting systems it is usual to distribute the picture signals pertaining to a television program as a modulated high frequency carrier-wave and the accompanying sound signals as audio frequency signals. Both the picture and sound signals are carried by a common pair of conductors. The signal adapter by which a television receiver designed for use with an aerial is made to respond to the picture signals as distributed over the wired broadcasting system commonly translates the modulated high frequency carrier wave picture signal to a suitable VHF or UHF channel for application to the television receiver, the accompanying audio frequency sound signals being applied directly to the loudspeaker of the television receiver or to a separate loudspeaker.

With the advancement of wired broadcasting system subscribers are continually seeking greater variety of sound programs. An economical method of providing additional sound programs is by transmitting them as frequency-modulated high frequency carriers superimposed on the same conductor pairs which carry the television signals. In many cases the subscribers require separate receiving equipment to utilize these sound-only programs. With the advent of frequency-modulated sound as the means of transmitting the sound accompaniment of television signals to receivers designed for aerial reception, subscribers having suitable television receivers can readily receive additional sound programs distributed over the wired broadcasting system by utilizing the signal adapter. However, it is not unusual for television receivers which are adapted to receive the accompanying sound as a frequency-modulated signal to derive said accompanying sound signal by the intercarrier method. As the derivation of sound signals in such an intercarrier sound television receiver relies on the presence of the picture carrier, sound-only transmissions which do not accompany a television picture signal cannot be received by such intercarrier sound television receivers.

It is an object of the present invention to provide a signal adapter for a wired broadcasting system in which means are provided whereby a television-receiving apparatus of the kind in which the sound signals are received by the intercarrier method is enabled to receive sound transmissions which do not accompany a television picture signal.

Accordingly the invention provides a wired broadcasting system which includes at least one television receiver designed for use with an aerial and in which sound signals accompanying a television transmission are arranged to be received by the intercarrier method and a signal adapter arranged between a conductive network of said system and the television receiver, said adapter including two oscillators, one for use in association with means which is effective to change the frequencies of the distributed program signals carried by the conductive network to frequencies to which said television receiver can be tuned and the other for providing a carrier wave signal which is applied to the television receiver together with a sound-only program signal, the frequency difference between said sound-only program signal and the carrier wave provided by said other oscillator differing by an amount such that the receiver is enabled to receive said sound signals by the intercarrier method in the absence of a television picture signal.

The invention also provides a signal adapter for a wired broadcasting system which includes two oscillators, one for use in association with means which is effective to change the frequencies of distributed program signals to frequencies to which a receiver designed for use with an aerial can be tuned and the other for providing a carrier wave signal which is applied to the receiver together with a sound-only program signal, the frequency difference between said sound-only program signal and the carrier wave provided by said second oscillator differing by an amount such that the receiver is enabled to receive said sound-only signals by the intercarrier method in the absence of a television picture signal.

In order that the invention may be more readily understood one particular embodiment thereof will now be described, by way of example only, with reference to the accompanying drawing which is a block schematic diagram of a high frequency wired broadcasting system in accordance with the present invention.

In the wired broadcasting system shown in the drawing a central transmitting apparatus indicated generally at 1 includes a television picture transmitter 2 which is arranged to transmit a high frequency carrier wave lying in the frequency range 4–10 MHz and amplitude modulated in respect of picture information, an audio frequency amplifier 3 arranged to provide sound signals to accompany the picture signals of the television transmission, a sound-transmitting apparatus 4 arranged to provide a frequency-modulated high frequency carrier wave, which may for example have a frequency of about 11 MHz, that is just outside the frequency band occupied by the picture transmissions from the transmitting apparatus 2 but not so far outside that frequency band has to suffer appreciable attenuation in repeater amplifiers of the wired broadcasting network through which the signals from the transmitting apparatus 1 are fed to subscriber's terminal stations. The high frequency carrier waves from the transmitters 2 and 4 and the audio frequency signals from the amplifier 3 are combined in a combining device 5 and applied to output terminals 6, 7 to which are connected the conductors 8, 9 of the wired distribution network. This network includes a plurality of repeater amplifiers such as shown diagrammatically at 10 and 11, the bandwidth of these amplifiers being such that both the picture and sound carriers provided by the transmitters 2 and 4 will pass through them.

The transmitter includes a plurality of subscriber's terminal stations 12, 13, etc. the terminal station 13 being shown in detail.

Each subscriber's terminal station includes an aerial television receiver 14 which is arranged to receive at its input terminal modulated carrier wave signals in the VHF band, preferably in the frequency range 40–220 MHz. For the purpose of illustration of the present invention it will be assumed that the television receiver 14 is of the type in which the sound signals which accompany the television transmission are received by the intercarrier method, that is to say the picture and sound signals are amplified together in the television receiver 14 by common amplifier stages which have a bandwidth sufficient to embrace the frequency bands occupied by both said picture and sound signals up to a common detector from which are derived picture signals at video frequency and modulated carrier wave sound signals, the frequency of said carrier wave corresponding to the frequency-spacing between the picture and sound signals applied to the input terminal of said receiver. Commonly this frequency difference is between 4.5 and 6.5 MHz depending upon the line standard on which the television receiver 14 is designed to operate.

It will be appreciated that the signals on the conductors 8, 9 need to be modified in order to be acceptable by the television receiver 14. This modification of the signals is effected by a receiver adapter 15 which is arranged to receive the signals on the conductors 8, 9 at input terminals 16, 17. The signals applied to the input terminals 16, 17 pass first to a splitter or filter device 18 which separates the high frequency signals on the lines 8, 9 from the audio frequency signals thereon. The high frequency signals appear on the line 19 whilst the audio frequency signals appear on the output line 20. The audio frequency signals on the output line 20 are applied to a matching transformer 21 and thus through a volume control 22 to a loudspeaker 23. Usually the loudspeaker 23 is separate from the television receiver 14 but if desired the loudspeaker already incorporated in said television receiver may be utilized if it is of a suitable type. The high frequency signals appearing on the output line 19 are passed to a frequency converter 24 which is arranged to receiver over an input line 25 oscillations produced by an oscillator device 26 the frequency of which is such that the high frequency carrier wave on the input line 19 is converted to a high frequency in the VHF band which is acceptable by the television receiver 14. The VHF signal is applied to the receiver 14 by means of the line 27. The frequency-modulated high frequency sound signal from the transmitter 4 also present on the conductors 8, 9 will at the same time appear as a VHF signal on the output line 27. However, this resulting VHF signal will fall outside the passband of the receiver 14 when conditioned to reproduce the television picture signal and so will not be reproduced.

When it is desired to receive the sound transmission provided by the transmitting apparatus 4 the loudspeaker 23 is disconnected, by means for example of a switch 28, and the frequency-modulated carrier wave at about 11 MHz present on the conductors 8, 9 is applied with the aid of the frequency converter 24 and oscillator 26 to a frequency, different from that to which it is converted during the reception of television picture signals, in the VHF range which corresponds to a frequency acceptable by the receiver 14 in respect of sound signals.

However, as mentioned previously, the receiver 14 is of the intercarrier type and so is unable to reproduce a sound signal in the absence of a carrier wave having the correct frequency spacing therefrom such as is the case when receiving a television picture signal and its sound accompaniment. The required carrier wave on the picture frequency is arranged to be provided by a second oscillator device 29 the output of which is connected into the line 19 when required by means of the switch 30. The frequency of the oscillations produced by the second oscillator device 29 is such that it differs from the frequency-modulated high frequency carrier at about 11 MHz by between 4.5 and 6.5 MHz as determined by the design of the receiver 14. Thus during the reception of the frequency-modulated high frequency sound program the frequency converter has applied to it the frequency-modulated sound signal and a carrier wave differing in frequency therefrom by about 4.5–6.5 MHz which carrier wave simulates in the receiver 14 a picture carrier. The frequency spacing determined at the input of the frequency converter 24 is maintained at the frequency in the VHF range which is provided on its output line 27. Thus the television receiver 14 is made effective to reproduce the sound-only signal carried by the conductors 8, 9.

The switches 28 and 30 may be arranged for actuation by a common control member 31 and this control member may be effective also to change the frequency of the oscillations produced by the oscillator device 26 to that required for the reception by the receiver 14 of, on the one hand, picture signals and, on the other hand, sound signals.

It will be appreciated that the arrangement shown in the drawing and described above is basically similar to a very high frequency wired broadcasting system except that the frequencies of the distributed television program signals will lie, for example, in the range 40–220 MHz instead of the range 4–10 MHz. It will be further appreciated that the receiver adapter 15 will differ in so far as the frequency of the oscillators 29 and 26 will differ from those described, the frequency produced by the oscillator 29 lying in the VHF range whilst the frequency provided by the oscillator 26 will correspond to the difference in frequency between the channel occupied by the incoming television program signal from the wired broadcast system and the frequency of the channel of said signals which are applied over the line 27 on the subscriber's receiver. Thus the frequency of the oscillator 26 is likely to lie in the HF range instead of the VHF range as described.

What we claim is:

1. A wired broadcasting system comprising in combination, an intercarrier television receiver tuned for receiving RF broadcast signals in the VHF band above 40 MHz, said wired system providing subscription amplitude modulated picture signals on a carrier in a frequency range differing from said broadcast signals and providing subscription sound-only signals separate from the picture transmission frequency modulated on a carrier frequency outside the said picture signal frequency range, and a signal adapter having two oscillators and a frequency converter, the first oscillator providing selectively different frequency for changing in said frequencies converter both the subscription signals to a band accepted by said television receiver, and the second oscillator having a frequency differing from the subscription carrier sound-only signal as converted by said converter by the intercarrier sound frequency of said receiver to produce a carrier for said sound-only signals, and said frequency converter coupling said two oscillator frequencies to said receiver for intercarrier processing of the subscription sound-only signals by the standard circuits of said television receiver.

2. A wired broadcasting system as claimed in claim 1, which includes a television-transmitting apparatus arranged to provide a high frequency carrier wave amplitude modulated by television picture signals, audio frequency signals carrying the accompanying sound transmission and means transmitting at least one high frequency signal at or adjacent the edge of the frequency band occupied by the television picture signals and modulated by a sound-only transmission separate from the television picture transmission.

3. A wired broadcasting system as claimed in claim 1, wherein the amplitude modulated television picture transmission lies in the frequency range 4-10 MHz and the sound-only transmission has a frequency of about 11 MHz.

* * * * *